Dec. 5, 1967  H. E. TOBEY  3,355,857
METHOD AND APPARATUS FOR PACKAGING ARTICLES
Filed Jan. 21, 1965  4 Sheets-Sheet 1

INVENTOR.
HUBERT E. TOBEY
BY
*Curtis Ailes*
ATTORNEY

Dec. 5, 1967   H. E. TOBEY   3,355,857
METHOD AND APPARATUS FOR PACKAGING ARTICLES
Filed Jan. 21, 1965   4 Sheets-Sheet 2

Dec. 5, 1967  H. E. TOBEY  3,355,857
METHOD AND APPARATUS FOR PACKAGING ARTICLES
Filed Jan. 21, 1965  4 Sheets-Sheet 3

Dec. 5, 1967 H. E. TOBEY 3,355,857
METHOD AND APPARATUS FOR PACKAGING ARTICLES
Filed Jan. 21, 1965 4 Sheets-Sheet 4

United States Patent Office 3,355,857
Patented Dec. 5, 1967

3,355,857
METHOD AND APPARATUS FOR PACKAGING ARTICLES
Hubert E. Tobey, Rochelle Park, N.J., assignor to Continental Baking Company, Rye, N.Y., a corporation of Delaware
Filed Jan. 21, 1965, Ser. No. 427,075
8 Claims. (Cl. 53—182)

ABSTRACT OF THE DISCLOSURE

A group of articles to be packaged is conveyed on a belt 12 (FIG. 1) between two sheets 18, 20 of thermoplastic film materials 21, 22. The side edges of the two sheets of film are continuously sealed together by gripping at positions laterally spaced apart by means of belts 46, 48 and 50, 52 (FIG. 4). The belts convey the films into tension over an upwardly inclined hot wire 62 causing them to be heated and fused, to thereby sever the edges while fusing and joining the upper and lower films at the severed edges (FIG. 6). A device 26 (FIG. 1) cuts off and seals the trailing edge of each package 30 while at the same time sealing the films 18, 20 for what will become the leading edge of the next succeeding package 30.

---

This invention relates to a method for packaging groups of articles together and to apparatus for carrying out the method. More particularly, this invention relates to a method and apparatus useful for packaging comestible articles, and particularly bakery products, such as hamburger buns.

Description of the prior art

Until the present time, packaging methods and machines which are particularly well adapted for packaging bakery products have frequently involved too much expense, and have provided packages which are too small for many users in terms of the number of articles in an individual package. Furthermore, in large packages for quantity users, bakery product articles such as hamburger buns have often been packaged manually in re-usable boxes. It is obviously desirable from the standpoint of both economy and sanitation to avoid manual handling of such bakery products, and to provide complete sealing of the products within packages which may be shipped in re-usable boxes. In this way, the sanitation and cleanliness of the shipment does not depend upon the cleanliness of the re-used boxes. Furthermore, prior packaging methods have generally been much too slow.

Accordingly, it is one object of the present invention to provide a method and apparatus for rapid, sanitary, and inexpensive packaging of a group of comestible articles such as bakery products.

Another object of the present invention is to provide a completely sealed package of a relatively large number of bakery product articles such as hamburger buns which may be rapidly placed with other similar packages in a re-usable box for shipment.

Another object of the present invention is to provide a loose package of comestible articles such as buns by an improved method including a rapid and continuous process for sealing the side edges of the package.

Another object of the present invention is to provide an improved method for producing a loose package of comestible articles, such as buns, which consists of upper and lower sheets of thermo-plastic film material completely joined and sealed together around the peripheral edges.

Another object of the invention is to provide a package of the above description which forms a complete and reliable enclosure for the packaged articles, but which is particularly characterized by ease of opening.

Summary of the invention

In carrying out the method of the invention in one preferred form thereof, the articles to be packaged are conveyed between two sheets of thermo-plastic film material. The front and back edges of the sheets of film material are sealed together, and at least one of the side edges of the two sheets of thermo-plastic film material are continuously sealed together by gripping the upper and lower sheets of film material at the side edge to be sealed at positions laterally spaced apart with respect to the direction of conveyance of the package. The two sheets of thermo-plastic film are conveyed into a position of tension over an upwardly inclined elongated heated member positioned between the two paths at which they are gripped so as to fuse and join the layers at the position of tension.

Further objects, features, and advantages of the invention will be apparent from the following description and the accompanying drawings.

Brief description of the drawings

FIG. 1A is an enlarged sectional detail view of a cut-off device employed in the apparatus of FIG. 1.

Description of the preferred embodiment

Figure 1:
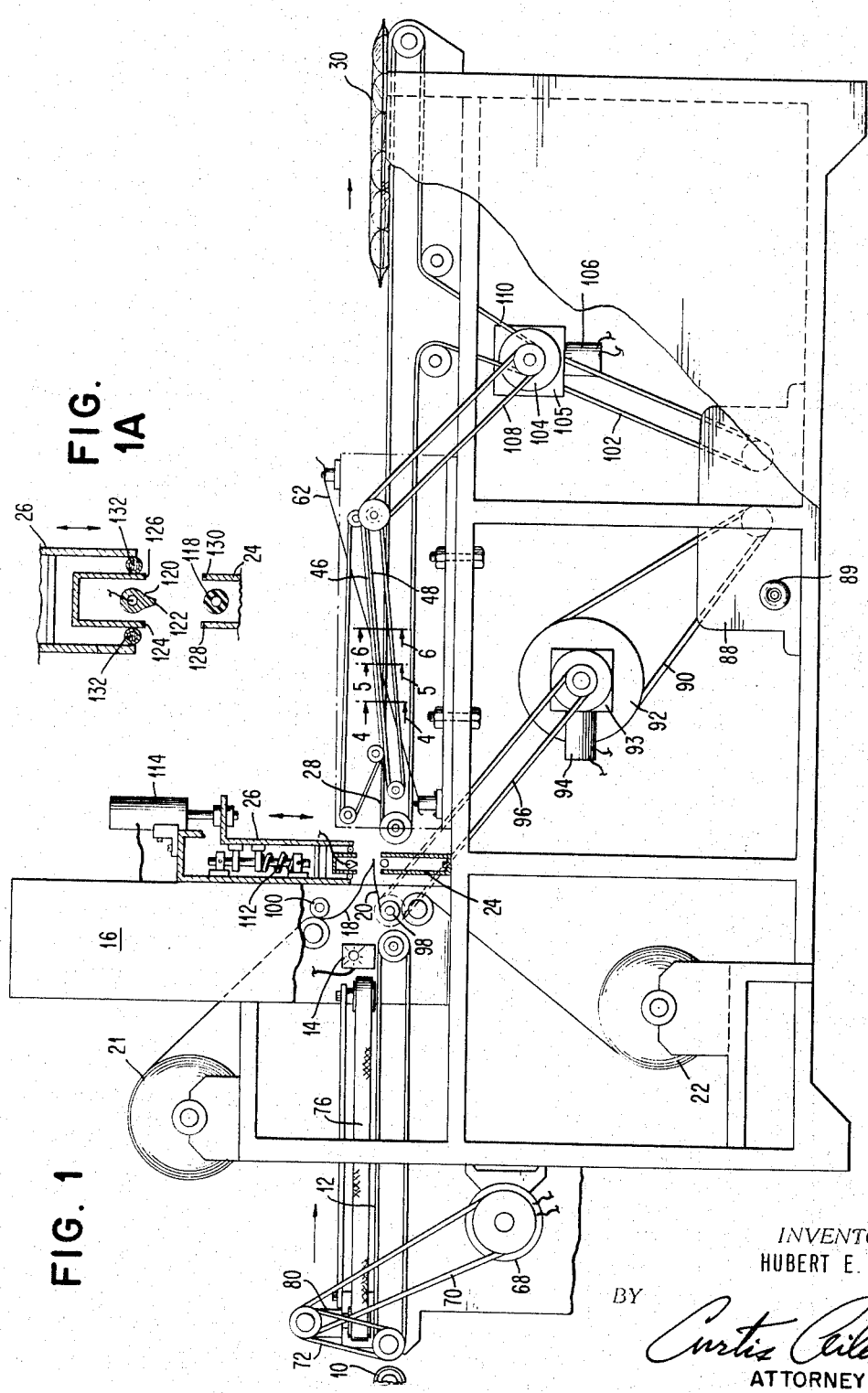
FIG. 1 is a side view, partially in section, of a preferred form of apparatus for carrying out the method of the present invention.

Referring particularly to FIG. 1 of the drawings, the packaging process of the present invention may be described, with reference to the illustrated apparatus, as follows:

A group of articles to be packaged, such as a panful of buns, which may consist for instance of two dozen buns, enters the apparatus on an entrance conveyor 10 shown at the extreme left of FIG. 1 and proceeds to the right onto a second entrance conveyor belt 12 until the first of the buns actuates a control device consisting of a photo-electric cell 14. The control signal from 14 is supplied to an electrical control system in the housing 16. In response to the signal from 14 to the control system 16, upper and lower sheets of thermo-plastic film packaging materials, indicated at 18 and 20, are driven together with the buns, and at the same speed, in a forward direction to the right in the drawing. The packaging materials 18 and 20 are respectively supplied from packaging material rolls 21 and 22.

The buns continue together with the sheets of packaging film through a cut-off station, including an anvil 24 and a cut-off device 26, onto an exit conveyor belt 28. The combination of buns and packaging sheet materials 18 and 20 continue on the exit belt 28 until the entire group of buns to be packaged together has passed through the cut off station. At this time the exit conveyor stops momentarily and the cut-off device 26 descends to cut off and seal the trailing edge of the package, while at the same time sealing the front or leading edge of what will become the next succeeding package. The cut-off device 26 then rises again, and the exit conveyor 28 resumes operation and carries the package on through the apparatus as indicated at 30.

While the newly forming packages are being conveyed along the exit belt 28, the side edges of the sheets of thermoplastic film material are squeezed together by a combination of four belts on each side. These belts consist of two laterally spaced apart pairs of belts, each pair consisting of a belt above and a belt below the two sheets of thermo-plastic film packaging material. The outermost pair of these edge holding belts is shown in FIG. 1 to consist of belt 46 and belt 48. These edge holding belts are much more clearly illustrated in the top view of the apparatus in FIG. 2.

Figure 2:
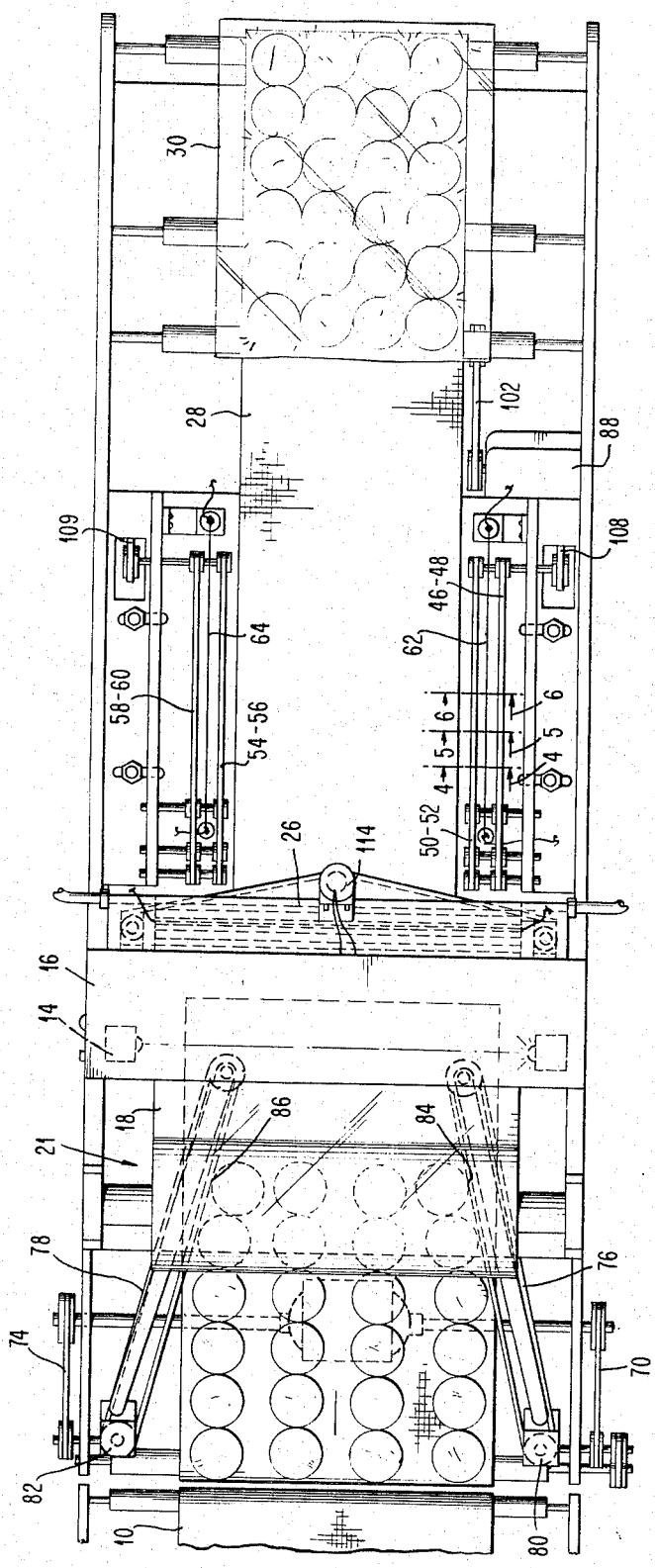
FIG. 2 is a top view of the apparatus of FIG. 1.

In FIG. 2, the belts on the right edge are shown to include an inner pair of belts 50 and 52, which are laterally spaced from the upper and lower belts 46 and 48. On the left side, there are provided an inner pair of belts 54 and 56, and an outer pair of belts 58 and 60. Between the associated pairs of edge holding belts 46–48 and 50–52, there is positioned an upwardly inclined hot wire 62, which is maintained at a temperature substantially above the melting temperature of the sheet thermo-plastic film packaging material by passing an electric current through the wire. A similar wire 64 is positioned between the pair of belts 54–56 and the pair of belts 58–60. The combination of the belts 46 to 60 with the inclined heated wires 62 and 64 provides for rapid, continuous, and reliable cutting off and sealing of the edges of the two packaging films, the upper and lower films being securely joined at the edges by the melting together and the fusing of these films.

This edge sealing operation is more fully described below in connection with FIGS. 4, 5, and 6.

Figure 3:
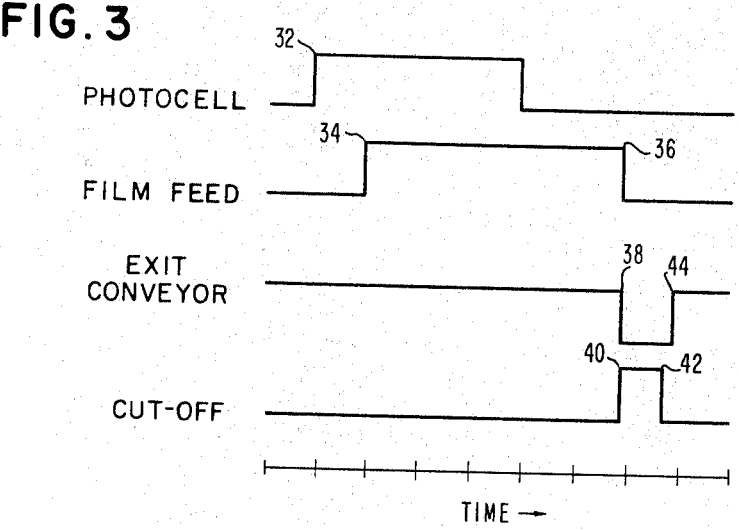
FIG. 3 is a timing diagram illustrating the sequence of operations of various parts of the apparatus of FIG. 1 in relation to other parts.

The timing of the operation of the basic components of the apparatus of FIG. 1 is illustrated in FIG. 3. As indicated at point 32 on the photocell curve, the cycle of operation is initiated by interruption of the beam of the photocell 14. After a brief time delay during which the leading buns have a chance to enter the front of the new package formed by the packaging films 18 and 20, the film feed commences as indicated by point 34 in the film feed curve of FIG. 3. The film feed drive continues until all of the buns of the group pass through the cut off station, and then it is interrupted, as indicated at point 36 on the film feed curve. At the same time the exit conveyor movement is interrupted as indicated at point 38 on the exit conveyor curve, and the cut off device 26 is actuated as indicated by the point 40 on the cut off curve. A brief interval after the cut off device is raised again at point 42, the exit conveyor resumes operation as indicated at 44. The packaging cycle then repeats whenever a new group of buns arrives.

Figure 4:
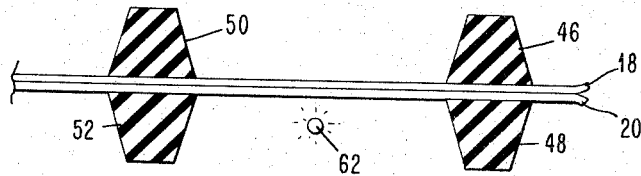
FIGS. 4, 5, and 6 illustrate successive stages in the side edge cut off and sealing operation of the preferred method and appartus in accordance with the present invention.
Figure 5:
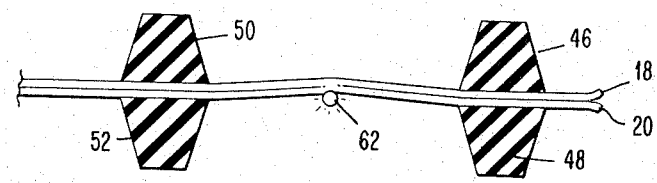
Figure 6:
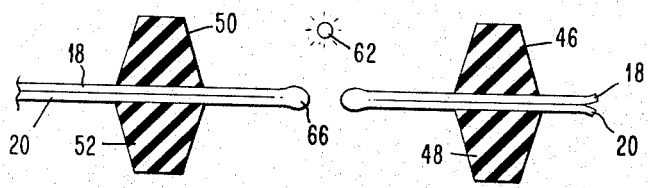

FIGS. 4, 5, and 6 are partial sectional views respectively taken at sections 4—4, 5—5, and 6—6 in either of FIGS. 1 or 2, and illustrating in detail the mode of operation of the side edge sealing arrangement just described above and employing the belts 46–52 and the inclined heated wire 62. In each of the FIGS. 4, 5, and 6, the background details and the surrounding components have been omitted from the drawings in order to simplify and clarify the presentation of the special features.

In FIG. 4, the gripping belts 46 and 48 are shown to embrace and hold together the upper and lower sheets 18 and 20 of the thermo-plastic film packaging material. Similarly, the belts 50 and 52 operate together to embrace the two sheets of packaging material. All four of these belts are driven along together at the same linear speed as the exit conveyor belt 28. In FIG. 4, the sheets of packaging material are being conveyed along toward the heated inclined wire 62, but they have not yet engaged with this wire.

In FIG. 5, the gripping belts 46–48, and 50–52, have driven the sheets 18 and 20 into engagement with the inclined hot wire 62 and have begun to place these sheets under actual tension over the hot wire 62, assuring efficient heat transfer from the wire 62 to the sheets 18 and 20 to commence melting and fusing together of these sheets. Because of the continuous inclination of the wire 62, the sheets of film are subjected to a continuously increasing combination of heat and tension until the softening and melting of the material causes severance and disengagement from the wire as shown in FIG. 6.

In FIG. 6, the melting and fusing together and severing of the edges of the sheet packaging materials 18 and 20 has been completed, the edges of the package being fused together as shown at 66. The severed edges of the sheets 18 and 20 which continue to be gripped by the belts 46 and 48 are discarded but may be salvaged and reclaimed.

It will be appreciated that FIGS. 4, 5, and 6 are idealized in showing the sheet packaging material as actually thicker than it is in practice in relation to the size of the gripping belts 46–52. Accordingly, the edges gripped between belts 46 and 48, which are cut off and discarded, do not actually represent much volume of material.

Referring back again to FIG. 1, in conjunction with FIG. 2, the preferred form of apparatus illustrated in these figures will be described in more detail. First, as the buns enter on the first entrance belt 10, and are transferred to the second entrance belt 12, the spacing is reduced between earlier arriving and later arriving buns by operating the entrance belt 12 at a speed which is slightly lower than the speed of the first entrance belt 10. Thus, the later arriving buns on the first belt continue to move at a more rapid speed and catch up to the earlier arriving buns already on the slower moving belt 12. The drive motor for belt 10 is not shown. However, the belt 12 is driven by a motor 68, shown in FIG. 1, through the drive belts 70 and 72. The drive belt 70, and a corresponding drive belt 74 on the other side of the machine, shown in FIG. 2, are also arranged to drive side belt conveyors 76 and 78 through gear boxes 80 and 82 containing conventional bevel gears. As clearly indicated in FIG. 2, the side belt conveyors formed by belts 76 and 78 are inwardly inclined to form a constricted passage to reduce the lateral spacing between adjacent members of the group of buns being packaged. This action is indicated in FIG. 2 at 84 and 86, where the first buns in the outer rows of the first column of buns are in engagement with the side belt conveyors and are being moved in together. Because of this action of the side belt conveyors 76 and 78, the buns are brought together to make a reasonably compact package, without spaces between the buns, as indicated particularly by the finished package 30 in FIG. 2. The forward progress of the buns (to the right in FIGS. 1 and 2) is not retarded in any way by the side belt conveyors 76 and 78, since they are driven at a linear speed which is slightly higher than the speed of the entrance conveyor belt 12.

Power for driving the packaging film feed, and the exit conveyor 28, and the edge holding belts 46 to 60, is derived from a single electric motor through a variable speed drive box 88, shown in FIG. 1. Drive box 88 includes a speed adjustment wheel 89. By adjustment of the variable speed drive 88, the length of the package can be adjusted. In one practical embodiment, the package length can be adjusted in this manner from about 22 to 28 inches, as required. The driving connection for the packaging film feed includes a drive belt 90, an idler sheave 92 which provides a speed reduction, and which includes a solenoid operated clutch 93 having a solenoid indicated at 94. After passing through the clutch 93, the drive connection includes belt 96 and a drive roll 98 for the packaging film 20. An upper drive roll 100 for film 18 is also positively driven by a belt connection with roll 98, but this is omitted in the drawing to provide greater simplicity and clarity.

The driving connections for the exit belt 28 and the edge gripping belts 46–60 are provided from the variable speed drive 88 through a belt 102 to an idler sheave and roller arrangement indicated at 104. Included at the arrangement 104 is an electromagnetically operated clutch 105 having an electromagnet indicated at 106. The edge gripping belts 46 to 52 are driven from the idler arrangement 104 through the electromagnetic clutch 105 by means of a drive belt 108. A corresponding drive belt 109 is provided on the other side of the machine to drive the edge gripping belts 54–60. The exit conveyor belt 28 is also driven through the idler 104, whenever the electromagnetic clutch 105 is energized, by the arrangement of having the exit conveyor belt 28 run down and around a driving roller at 104 as indicated at 110.

At the cut off station, the cut off device 26 is driven down against the anvil 24 against the force of a return spring shown at 112 by means of a pneumatically operated drive piston generally indicated at 114. A driving fluid, such as compressed air, is admitted to the driving piston 114 by means of an electromagnetically operated valve 116, which is not separately shown in FIGS. 1 and 2, but which forms a part of the controls 16, and will be described later in relation to the schematic control diagram of FIG. 7.

FIG. 1A is an enlarged partial sectional detail view of the cut off station including the cooperating extremities of the anvil 24 and the cut off device 26 which engage one another to accomplish the cut off function. The anvil 24 includes a roller 118 which is preferably positively driven at the same linear speed as the entrance and exit belts 12 and 28, and which is preferably composed of a resilient heat resistant material such as a silicone rubber. For compressing the packaging film material against the anvil roller 118, the cut off device 26 includes a heated elongated cylindrical structure 120 which has a central core with an electrical heating element therein. The heated cylindrical structure 120 includes a radially downwardly extending elongated edge portion 122. On both sides of structure 120, edge holding clamping arrangements are provided by means of clamping members of 124 and 126 on the cut off device 26, which respectively engage with corresponding members 128 and 130 on the anvil 24. The driving connection on the anvil roller 118 is in common with the drive for the exit belt 28 and the side edge holding belts 46–60. Thus, the anvil roller 118 stops its rotation during the cut off operation. Since the cut off and sealing operation is to be accomplished only by the edge 122 engaging with the roller 118, and not by the clamping members 124 and 126, the edge clamping members are preferably cooled by the circulation of cooling liquid through a chamber 132 which is enclosed immediately above, and adjacent to, the clamping members 124 and 126.

Figure 7:
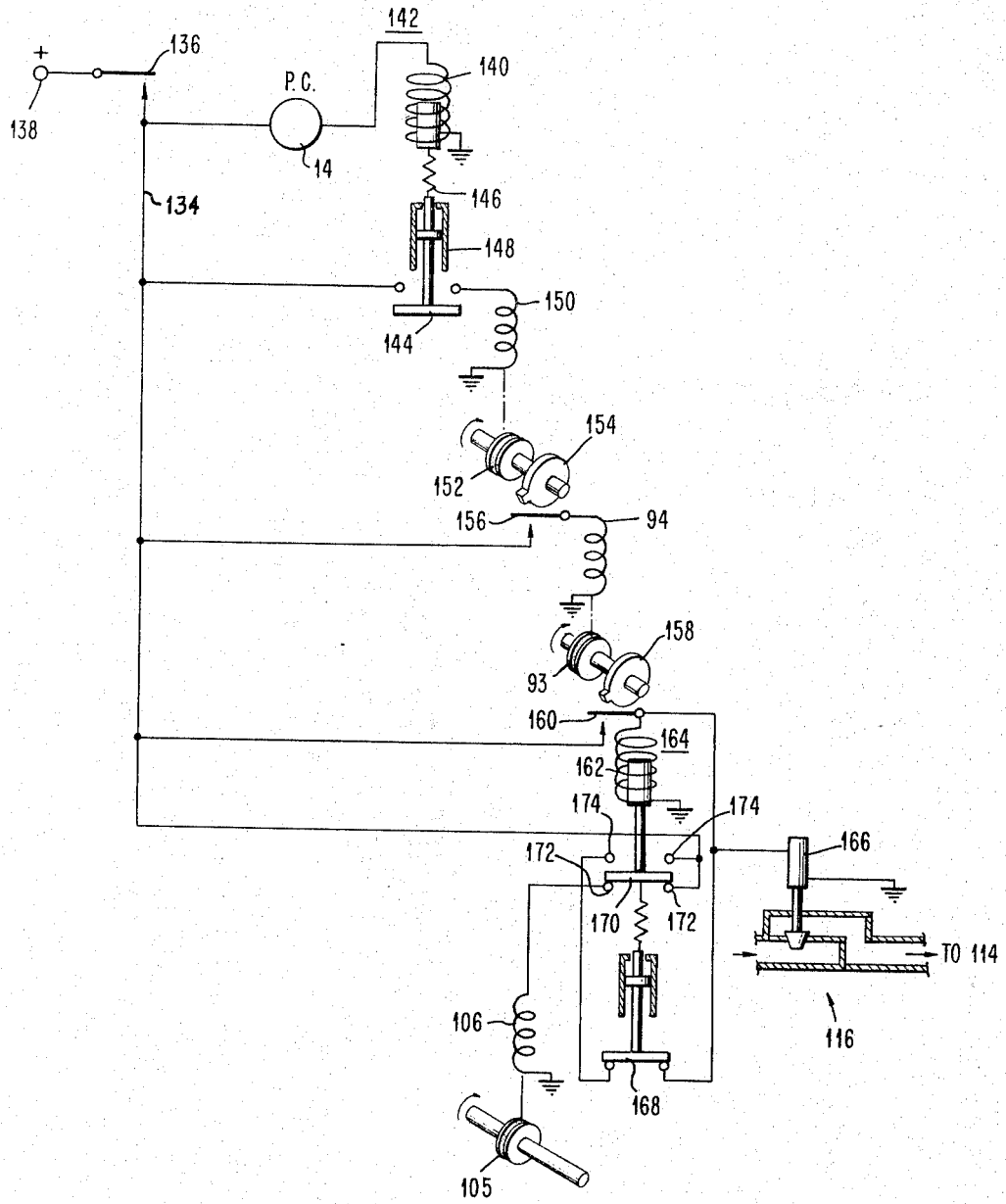
FIG. 7 is a schematic electrical circuit diagram of a control system for the apparatus of FIG. 1.

FIG. 7 is an electrical schematic diagram generally indicating the arrangement of the essential portions of the control system for the apparatus of FIGS. 1 and 2 in order to provide the operating cycle as indicated by the timing diagram of FIG. 3. In FIG. 7, power is provided from a power bus 134 through a main switch, schematically illustrated as a single pole switch 136, from a power input terminal 138. A conventional source of electrical power (not shown) may be connected between terminal 138 and ground. While a plus sign is shown at terminal 138, which would imply the use of DC power, it will be understood that conventional AC power, at conventional voltages, may be employed with the present apparatus.

Photocell 14 is connected to supply power from the bus 134 to the winding 140 of a time-delay relay 142. While 14 is referred to simply as a "photocell" it will be understood that it is actually a conventional photocell relay including relay contacts which are operated in response to an optical signal to the photocell component. In the present instance, since operation is desired upon interruption of the illumination, the switch contacts of the photocell relay 14 which are operable in the present circuit are normally closed relay contacts.

Relay 142 may be a conventional time delay relay, and it is schematically illustrated as having time delay contacts 144 which close after a desired delay time under the influence of a connection including a spring 146 which is placed under tension by the energization of the relay winding 140, and a pneumatic dashpot 148 which delays the resultant movement of the contacts 144. Closure of the relay contacts 144 energizes the solenoid winding 150 of an electromagnetic clutch 152 to cause the rotation of a cam 154. The cam 154 closes a switch 156 to energize the solenoid 94 of the electromagnetic clutch 93, previously mentioned in connection with FIG. 1, to commence the packaging of the film drive. After substantially a full revolution of the output shaft of this clutch, associated cam 158 causes the closure of an associated switch 160. Switch 160 energizes the winding 162 of another time delay relay 164, and also energizes the solenoid 166 of the pneumatic control valve 116 previously mentioned in connection with FIG. 1.

Thee time delay relay 164 is a conventional time delay relay which is similar to relay 142, and includes delayed opening contacts 168 and a non-delayed transfer switch 170. The non-delayed transfer switch 170 includes normally closed contacts 172 which provide power to winding 106 of electromagnetic clutch 105, previously referred to in connection with FIG. 1. This is the clutch which provides an operative driving connection to the exit belt 28 and edge holding belts 46–60. Thus, whenever the relay 164 is not energized, the exit belts are running.

The non-delayed transfer switch 170 also includes normally open contacts 174 which are operable through a circuit including the normally closed time delay contacts 168 to provide a power connection to the solenoid 166, and a "hold-in" connection to the relay winding 162 during the period after the relay 164 is energized, and before the time delay period for the opening of contacts 168 has expired.

The operation of the control system of FIG. 7 is described in conjunction with reference to the timing diagram of FIG. 3 as follows:

At the time 32 (FIG. 3) when the first arriving buns interrupt the illumination to photocell 14, the time delay relay 142 is energized, causing delayed energization of winding 150 of electromagnetic clutch 152, causing rotation of cam 154 and a delayed closing of switch 156 to thus energize the electromagnet 94 to begin the feed of packaging of film at time 34 (FIG. 3). Thus, the time delay from photocell actuation at time 32, until the film feed start at time 34, is accomplished by the time delay of relay 142 and the time required for rotation of cam 154. Similarly, a considerable time delay from 34 to 36 is provided by rotation of cam 158 before the switch 160 is closed. The clutch 93 is of the type which operates for a single revolution after the energization of its winding 94. Accordingly, the cam 158 makes one complete revolution and then stops, and the progress of the film feed from time point 34 to point 36 corresponds to one revolution to the cam 158. The apparatus is designed so that this period is sufficient for the entire group of buns to pass the cut off device 26.

As soon as the contacts 160 are closed, relay 164 is energized and the non-delay contacts 172 are thus opened to interrupt the exit conveyor 28 by de-energizing the winding 106 of the electromagnetically operated clutch 105. This is indicated by point 38 on the exit conveyor timing curve. At almost the same time, the solenoid 166 of the pneumatic control valve 116 is energized through the cam contacts 160, and this energization is continued through the normally open contacts 174, and the time delayed normally closed contacts 168. The pneumatic valve 116 actuates the pneumatic piston 114 (FIG. 1) of the cut off device 26 to cause the cut off device to descend and cut off and seal the package. The beginning of cut off device actuation is shown at 40 in FIG. 3. At the end if the time delay period, the contacts 168 open and deenergize the winding 166 of pneumatic valve 116, thus causing the cut off device to retract, as indicated at 42 in FIG. 3. The opening of the contacts 168 also deenergizes the holding connection to the winding 162 of relay relay 164, and causes the relay to drop out after a very short interval. This again closes the contacts 172 to re-energize the winding 106 of the electromagnetic clutch 105 for the exit belt 28. This instant of re-starting of the exit conveyor is indicated at 44 in FIG. 3. The system is then ready for a new packaging cycle.

From the foregoing description, it is quite apparent that the method and apparatus of the present invention provide for the rapid and efficient creation of a completely sealed and sanitary package which may consist of a single layer of bakery products such as hamburger buns. These single layer sealed packages may be stacked together into re-usable shipping boxes for shipment to retailers and consumers. A single layer package consisting of two dozen buns, as illustrated in FIGS. 1 and 2 is particularly useful for shipments to restaurants and other wholesale users. Also, it is obviously very convenient to package an entire pan full of two dozen buns in a single package. However, it is obvious that smaller packages may be produced by the same methods, and using the same machine, by simple readjustment of the machine to accommodate for a smaller package.

While the method and the machine, as disclosed above, are particularly useful and well adapted for packaging hamburger buns, it is quite apparent that other bakery products may also be packaged by the same method and by the same machine, with minor adjustments, if necessary. Furthermore, it is also apparent that the method and machine are equally usable for packaging other comestible products which must be packaged and sealed. For instance, many comestibles must be packaged this way for freezing.

The sheets of thermoplastic film used as packaging material in the present invention may each consist of a polyethylene film having a thickness of approximately 0.001 inch which is commercially available from a number of suppliers. However, it is quite apparent that the thickness of the thermoplastic film is not particularly critical, and therefore other thicknesses of packaging material may be employed. For thicker materials, additional heat may be required in the heaters 62, 64, and 120 used in the sealing operations. While polyethylene is very useful as the packaging material in the present invention, it is also apparent that other thermoplastic film materials may be employed such as plasticized polyvinyl chloride, or other vinyls for instance.

In a practical embodiment of the apparatus of the present invention, speeds of operation have been successfully achieved with belt speeds for belts 12 and 28 in the range from about 50 to 60 feet per minute. However, much higher speeds are achievable if desired. One reason for this speed capability is that with the positive engagement and tensioning of the edges of the packaging film over the inclined heated wires 62 and 64, very efficient heat transfer is accomplished and rapid movement of the package with complete edge sealing is possible. To further enhance the speed of the edge sealing operation, the angle of include of the heated wires 62 and 64 may be decreased to extend the period for effective heat transfer to the film. Also, additional electric current may be supplied to these heater wires 62 and 64, if necessary, to increase the speed of operation. Since the control circuits for the heater elements are conventional, they are not shown in the drawings.

While the method of the present invention has been exemplified by a single illustration of the method, and the apparatus by a single embodiment of the apparatus, it is quite apparent that various modifications will appear to those who are skilled in the art. Accordingly, it is the intention of the applicant to protect all variations and modifications within the true spirit and the valid scope of this invention.

I claim:

1. Apparatus for closing a package including upper and lower layers of a resilient thermoplastic sheet material comprising means for conveying the package in a direction essentially parallel to the edge to be sealed, means for gripping together and conveying the upper and lower layers at the edge to be sealed at two portions thereof laterally spaced apart with respect to the direction of conveyance, a single continuously upwardly inclined elongated heated member positioned between the two paths of the laterally spaced portions and extending substantially beyond the plane which is common to said paths, said gripping means being operable to convey the portion of said gripped side edge of said layers between the laterally spaced portions into tension over said heated member with the tension continuously increasing until the layers are softened and severed while fusing and joining the upper and lower layers at the severed edges thereof.

2. Packaging apparatus for groups of bakery articles such as buns comprising an entrance conveyor belt, package material feeding means arranged near the downstream end of said entrance belt and operable in response to the arrival of the first of a group of articles to be packaged to commence the feeding of sheets of thermoplastic packaging film material respectively above and below said group of articles at the speed of conveyance of said entrance belt, a lateral cut off and sealing station positioned immediately downstream from said packaging material feeding means and comprising an anvil positioned beneath the path of travel of the conveyed articles and a vertically movable heated cut off device positioned above said anvil, an exit conveyor belt positioned downstream from said cut off station and arranged to be driven at the same speed as said entrance belt, edge gripping means positioned adjacent to said exit belt on at least one side edge thereof, said edge gripping means comprising two pairs of laterally spaced belts, each pair consisting of an upper belt and a lower belt positioned to embrace said sheets of packaging material therebetween and connected to be driven with said exit belt, a single heated elongated edge sealing member upwardly inclined toward the downstream path of article movement and positioned in the lateral space between said pairs of edge gripping belts, the upward inclination of said elongated member extending substantially above the plane in which the side edges of the sheets are conveyed by said edge gripping belts so that said edge gripping belts are operable to positively engage said sheets of packaging material with said elongated member with increasing tension as the movement thereof progresses until the sheets are softened and severed while fusing and joining the upper and lower sheets at the severed edges thereof.

3. Apparatus for the packaging of groups of bakery product articles such as buns comprising a continuously operable entrance conveyor belt, switching means arranged near the downstream end of said entrance belt and operable in response to the arrival of the first of a group of articles to be packaged together, control means operable in response to said switching means, package material feeding means operable in response to said control means to commence the feeding of two sheets of thermoplastic packaging film material respectively above and below said group of articles at the speed of conveyance of said entrance belt, a lateral cut off and sealing station positioned immediately downstream from said packaging material feeding means and comprising an anvil positioned beneath the path of travel of the conveyed articles and a vertically movable heated cut off device positioned above said anvil, an exit conveyor belt positioned downstream from said cut off station and arranged to be driven at the same speed as said entrance belt, edge gripping means positioned adjacent to said exit belt on each side edge thereof, said edge gripping means on each side comprising two pairs of laterally spaced belts, each pair consisting of an upper belt and a lower belt positioned to embrace the sheets of packaging material therebetween, said edge gripping belts being arranged to be driven with said exit belt, a single heated elongated member inclined upwardly toward the downstream path of article movement and positioned in the lateral space between said pairs of edge gripping belts on each side, the upward inclination of said elongated member extending substantially above the plane in which the side edges of the sheets are conveyed by said edge gripping belts so that said edge gripping belts are operable to engage said sheets of packaging material under increasing tension across said elongated member as the movement progresses until the sheets are softened and severed, the engagement of said packaging material with said elongated member causing the upper and lower layers of packaging material to fuse and bond together, said control means being operable after all of said group of articles has moved beyond said cut off and sealing station to actuate said cut off and sealing device to thereby cut off and seal the trailing edge of the package and to concurrently seal together the edges of the packaging material sheets to form a front seal for the next succeeding package.

4. Apparatus for the packaging of groups of bakery product articles such as buns comprising a continuously operable entrance conveyor belt, side belt conveyors positioned on opposite sides above said entrance belt and arranged at inwardly inclined angles to form a constricted passage to reduce the lateral spacing between adjacent members of the group of articles to be packaged, said side belt conveyors being arranged to be driven slightly faster than said entrance belt, switching means arranged near the downstream end of said entrance belt and operable in response to the arrival of the first of a group of articles to be packaged together, control means operable in response to said switching means, package material feeding means operable in response to said control means to commence the feeding of two sheets of thermoplastic packaging film material respectively above and below said group of articles at the speed of conveyance of said entrance belt, a lateral cut off and sealing station positioned immediately downstream from said packaging material feeding means and comprising an anvil positioned beneath the path of travel of the conveyed articles and a vertically movable cut off device positioned above said anvil, said anvil comprising a roller of heat resistant rubber-like material which is arranged to be driven at the same speed as said entrance belt, said cut off device comprising an elongated structure having a heating element therein and a radially downwardly extending elongated edge portion arranged for engagement with said anvil, an exit conveyor belt positioned downstream from said cut off station and arranged to be driven at the same speed as said entrance belt, edge gripping means positioned adjacent to said exit belt on at least one side edge thereof, said edge gripping means comprising two pairs of laterally spaced belts, each pair consisting of an upper belt and a lower belt positioned to embrace said sheets of packaging material therebetween, said edge gripping belts being arranged to be driven with said exit belt, a heated elongated member inclined upwardly toward the downstream path of article movement and positioned in the lateral space between said pairs of edge gripping belts so that said edge gripping belts are operable to engage said sheets of packaging material under increasing tension across said elongated member as the movement progresses, the engagement of said packaging material with said elongated member causing the upper and lower layers of packaging material to fuse and bond together, said control means being operable after all of said group of articles has moved beyond said cut off and sealing station to stop said exit belt and to actuate said cut off and sealing device to thereby cut off and seal the trailing edge of the package and to concurrently seal together the edges of the packaging material sheets to form a front seal for the next succeeding package.

5. Apparatus for the sanitary packaging of groups of bakery product articles such as buns in a loose single layer package comprising a continuously operable entrance conveyor means for feeding in entering articles to be packaged, said conveyor means including a first conveyor belt operating at a first speed and a second conveyor belt operating at a second speed which is slower than the speed of said first belt so as to reduce the spacing of later arriving members of the group of articles to be packaged with respect to the earlier arriving members of said group, side belt conveyors positioned on opposite sides above said second belt and arranged at inwardly inclined angles to form a constricted passage to reduce the lateral spacing between adjacent members of said group of articles to be packaged, said side belt conveyors being driven at the same speed as said second belt, switching means arranged near the downstream end of said second belt and operable in response to the arrival of the first of a group of articles to be packaged together, control means operable in response to said switching means, package material feeding means operable in response to said control means to commence the feeding of a sheet of thermoplastic packaging film material beneath said group of articles and another sheet of thermoplastic packaging film material above said articles at the speed of conveyance of said second belt after a predetermined time delay, a lateral cut off and sealing station positioned immediately downstream from said packaging material feeding means and comprising an anvil positioned beneath the path of travel of the conveyed articles and a vertically movable cut off device positioned above said anvil and vertically movable into engagement therewith for accomplishing a cut off and sealing function, said anvil comprising a silicone rubber roller which is driven to have the same linear speed as said second belt, said cut off device comprising a heated elongated cylindrical structure having a radially downwardly extending elongated edge portion arranged for engagement with said anvil, a third conveyor belt positioned downstream from said cut off and sealing station and operable at the same speed as said second belt, edge gripping means positioned adjacent to said third belt for gripping at least one side edge of the upper and lower sheets of thermoplastic packaging material, said edge gripping means comprising two pairs of laterally spaced belts, each pair consisting of an upper belt and a lower belt positioned to embrace said sheets of packaging material therebetween, said edge gripping belts being driven with said third conveyor belt, a heated wire inclined upwardly toward the downstream path of package movement and positioned in the lateral space between said pairs of edge gripping belts so that said edge gripping belts are operable to place said sheets of packaging material under increasing tension across said inclined heated wire as the movement of said packaging material by said edge gripping belts progresses, the engagement of said packaging material under said increasing tension causing said packaging material to melt and causing the upper and lower layers of packaging material to fuse and bond together to thereby seal the package, said control means being operable at a predetermined time delay period after a signal from said switching means sufficient for all of said group of articles to move beyond said cut off and sealing station to stop said third conveyor belt and said edge gripping belts and said anvil roller momentarily and to actuate vertical downward movement of said cut off and sealing device to thereby cut off and seal the trailing edge of the package formed by the sheets of thermoplastic packaging film material around the group of articles and to concurrently seal together the edges of the packaging material sheets to form a front seal for the next succeeding package.

6. Apparatus for closing a package including two sheets of a resilient thermoplastic material covering opposite sides of the package comprising means for conveying the package in a direction essentially parallel to the edge to be sealed, means for gripping together and conveying the two sheets at the edge to be sealed at two portions thereof spaced apart transversely with respect to the direction of conveyance, a single elongated heated member having an operable edge portion positioned between the two paths of the transversely spaced portions and inclined from a position on one side of the plane of travel of the gripped edge of the sheets in a path converging at an acute angle with said plane of travel and extending substantially beyond said plane of travel on the other side thereof, said operable edge portion of said heated member being positioned in a plane generally perpendicular to said plane of travel and parallel to the direction of travel of the sheets and being operable to provide a combination of heat and tension in the sheets which continuously increases until the sheets are softened and severed, and whereby the upper and lower sheets are fused and joined at the severed edges thereof.

7. Apparatus in accordance with claim 6 wherein said heated member comprises an electric current conducting wire supported under tension by mountings at the respective ends thereof.

8. Apparatus for sequentially packaging individual groups of bakery products such as buns within upper and lower layers of thermoplastic film packaging material comprising a conveying means, a heated cutoff and sealing device arranged transversely with respect to said conveying means for joining and cutting off the leading edges of the upper and lower layers of thermoplastic film packaging material, said conveying means being operable to advance the bonded leading edges of said layers and to concurrently advance a group of buns to be packaged between said layers, means for concurrently gripping each of the side edges of said layers, said side edge gripping means being operable to grip each edge at two portions laterally spaced apart with respect to the direction of film movement, a single continuously upwardly inclined elongated heated member positioned between the two paths of the laterally spaced portions and extending substantially beyond the plane which is common to said paths, said gripping means being operable to convey the portion of said gripped side edges of said layers between the laterally spaced portions into tension over said heated member with the tension continuously increasing until the layers are softened and severed while fusing and joining the upper and lower layers at the severed edges thereof by a transfer of heat to the layers from said elongated heated member, said conveying means being operable to interrupt the movement of said buns and said layers, said transversely arranged cutoff and sealing device being then operable to cut off and seal the trailing edge of the layers while concurrently sealing the leading edge of the layers for the next succeeding package.

References Cited

UNITED STATES PATENTS

| 2,931,148 | 4/1960 | Smith | 53—28 |
| 3,015,920 | 1/1962 | Saumsiegle | 53—373 X |
| 3,142,608 | 7/1964 | Techtmann et al. | 156—515 |
| 3,243,330 | 3/1966 | Zelnick | 156—515 |
| 3,243,487 | 3/1966 | Smith | 156—583 |

FOREIGN PATENTS

| 1,327,434 | 4/1963 | France. |
| 996,580 | 6/1965 | Great Britain. |

ROBERT C. RIORDON, *Primary Examiner.*

N. ABRAMS, *Assistant Examiner.*